(No Model.)
E. D. SCHMITT.
CLUTCH.
No. 464,481. Patented Dec. 1, 1891.
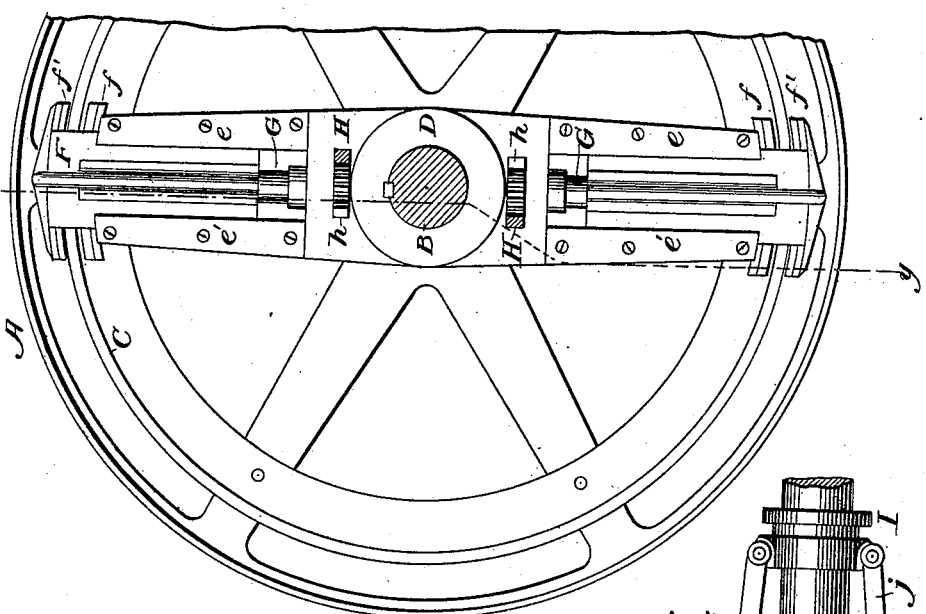
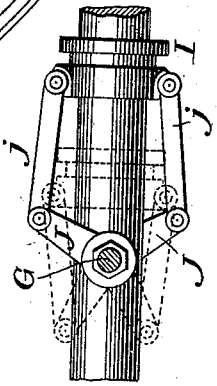
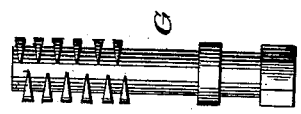
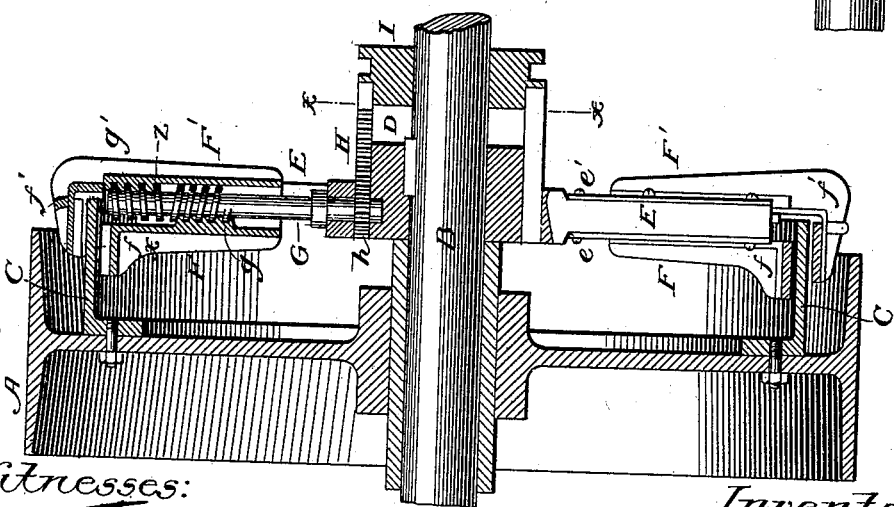
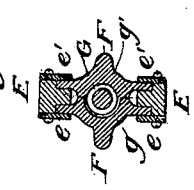
Witnesses:
James T. Daw
Fred S. Kemper
Inventor:
Edward D. Schmitt
by Livingston Gifford
Atty ced Pa# UNITED STATES PATENT OFFICE.

EDWARD D. SCHMITT, OF CUYAHOGA FALLS, OHIO.

CLUTCH.

SPECIFICATION forming part of Letters Patent No. 464,481, dated December 1, 1891.

Application filed February 1, 1888. Serial No. 262,673. (No model.)

*To all whom it may concern:*

Be it known that I, EDWARD D. SCHMITT, a citizen of the United States, residing at Cuyahoga Falls, in the county of Summit and State of Ohio, have invented a certain new and useful Clutch, of which the following is a specification.

My invention has relation to improvements in that class of clutches in which radially-acting jaws simultaneously moving in opposite directions grasp or release on opposite sides a rim or flange concentric with and parallel to the axis of the clutch mechanism.

The object of my invention is to provide new and improved devices for moving said jaws.

One form of mechanism embodying my invention is illustrated in the accompanying drawings, as hereinafter described and claimed.

In the accompanying drawings, in which similar reference-letters indicate like parts, Figure 1 is a central vertical section of a pulley and clutch embodying my invention on the line *y y* of Fig. 2; Fig. 2, an elevation of the pulley and clutch, the shaft and connected parts shown in section at the line *x x* of Fig. 1; Fig. 3, a section of the sliding jaws and screw at the line *z z* of Fig. 1; Fig. 4, a modified form of the screw for moving the jaws, and Fig. 5 a modification of the screw-turning mechanism.

In the drawings, A is a pulley mounted by means of a loose sleeve A' on the shaft B. Attached to the pulley A, concentric with its periphery and parallel with the axis of the shaft B, is a friction-rim C. Upon the shaft B is keyed a hub D, from which on opposite sides project radial arms E, having radial openings with parallel faces, which constitute ways or guides in which the inner and outer clutch members F F', bearing the jaws *f f'*, fit and slide and in which they are retained by the plates *e e'*, bolted or screwed to said arms. On the inner face of each clutch member F F' is a projection or lug *g g'*, each having a screw-threaded portion, the threads in opposite adjacent lugs being, respectively, right and left handed. Journaled longitudinally in the arms E, between the clutch members F F', are shafts G, upon each of which are two screw-threads, one right and the other left handed, opposite and arranged to mesh with the screw-threads of the adjacent clutch members. On the inner end of each shaft G is a pinion *h*, which meshes in a rack H, arranged to be moved longitudinally with the axle B by the sliding collar I. By sliding the collar I toward the hub D, the jaws *f f'*, by means of the mechanism described, grasp the rim C and communicate motion from the shaft B to the pulley A, and by reversing the operation they release it.

Instead of having the screw-threads on different parts of the shafts G, a double thread may be cut in the same place, as shown in Fig. 4, in which case the screw-threaded lugs of adjacent clutch members would be opposite.

Other devices, also, for turning the screw-threaded shafts may be substituted for the racks and pinions, one of which is shown in Fig. 5, in which crank-arms J are attached to the ends of the shafts G, and connected with the collar I by links *j*.

It will be observed that in closing the jaws of this clutch the active agents are two inclines or inclined bearing-surfaces, one formed by the inner surface of a screw-thread engaging with the outer clutch member and the other formed by the outer surface of a screw-thread engaging with the inner clutch member. The mechanism described also illustrates how two inclines may be employed for opening the clutch, one formed by the outer surface of a screw-thread engaging with the outer clutch member and the other formed by the inner surface of a screw-thread engaging with the inner clutch member. The two inclines by which the clutch is closed are inversely inclined, and the two inclines by which the clutch may be opened are also inversely inclined. When, as shown in the drawings, each clutch member bears simultaneously upon the incline by which it is closed and upon the incline by which it may be opened, the effect is that the clutch members cannot move, except as the inclines move. I have shown the inclines as of spiral form, which I consider to be convenient, because it enables them to be mounted upon a shaft, by the rotation of which they are given motion; but I do not wish to limit myself to inclines of this form or thus mounted, since I am well aware that inclines embodying the principle of my invention might be constructed of almost any form and mounted upon almost any piece of mechanism moving upon the clutch-arm, providing only that the inclines for moving one clutch member shall be inversely inclined to those for moving the other. Neither do I desire to limit myself to the employment of the inclines for opening the jaws unless so specified in the claims.

I claim—

1. In a clutch, the combination, with a loose pulley provided with an inner rim, of a hub having radial arms, and radially-movable members provided with jaws, said members having screw-threads, a radial shaft having corresponding threads arranged to mesh in the respective threads of said members to cause the jaws to grasp and release opposite sides of the inner rim of the pulley, and devices by which said radial shaft may be revolved, substantially as described.

2. In a clutch, in combination with the flange cylindrical to the shaft, a hub having radial arms, a rotatable radial shaft having bearing-surfaces inclined to its axis of rotation, radially-movable members provided with jaws adapted to grip said flanges on both sides and also provided with bearing-surfaces engaging with the bearing-surfaces upon said shaft to cause the jaws to grasp both sides of the flange, and devices by which said radial shaft may be revolved, substantially as described.

3. In a clutch, the combination, with a flange cylindrical to the shaft, of radially-movable members provided with jaws adapted to grip said flange on both sides, a clutch-arm, a radial shaft rotatably mounted thereon, inverse inclines interposed between said shaft and said members, respectively, a piece fixed upon the lower end of said shaft and extending laterally therefrom providing leverage for rotating the same, a shifter-sleeve, and a piece connecting said shifter-sleeve with said first-named piece, whereby the reciprocation of said shifter-sleeve rotates said radial shaft, substantially as described.

4. In a clutch, in combination, a flange cylindrical to the shaft, a clutch-arm fast to the shaft, movable clutch members provided with jaws adapted to grip said flange on both sides, an incline facing toward the shaft and engaging with the outer clutch member, an incline facing from the shaft and engaging with the inner clutch member, and devices whereby said inclines may be moved to cause said jaws to grip the flange, substantially as described.

5. In a clutch, in combination, a flange cylindrical to the shaft, a clutch-arm, movable clutch members seated upon said clutch-arm and provided with jaws adapted to grip the flange on both sides, an incline facing toward the shaft and engaging with the outer clutch member, an incline facing from the shaft and engaging with the inner clutch member, and devices whereby said inclines may be moved to cause said jaws to grip the flange, substantially as described.

6. In a clutch, in combination, a flange cylindrical to the shaft, a clutch-arm, movable clutch members provided with jaws adapted to grip said flange on both sides, a piece having its bearings in said clutch-arm and provided with inversely-inclined inclines engaging, respectively, with the outer and inner clutch members, and devices by which said piece is moved upon the clutch-arm, substantially as described.

7. In a clutch, in combination, a flange cylindrical to the shaft, a clutch-arm, movable clutch members provided with jaws adapted to grip said flange on both sides, an incline facing toward the shaft and engaging the inner clutch member, an incline facing from the shaft and engaging the outer clutch member, said two inclines being inversely inclined, and devices whereby said inclines may be moved to cause the opening of said jaws, substantially as described.

8. In a clutch, in combination, a flange cylindrical to the shaft, a clutch-arm, movable clutch members provided with jaws adapted to grip said flange on both sides, two inversely-inclined inclines engaging, respectively, with the inner and outer clutch members and facing in opposite directions, two other inversely-inclined inclines, also facing in opposite directions and also engaging, respectively, with the inner and outer clutch members, and devices by which said inclines may be moved whereby the jaws may be both closed and opened, substantially as described.

9. In a clutch, in combination, a flange cylindrical to the shaft, a clutch-arm, radially-movable members provided with jaws adapted to grip said flange on opposite sides and seated upon said clutch-arm, a piece having its bearings in said clutch-arm and provided with four inclines, two of them facing in opposite directions engaging with the outer clutch member and two of them also facing in opposite directions engaging with the inner clutch member, and those inclines engaging with the outer clutch member being inversely inclined to those engaging with the inner clutch member, whereby the motion of said inclines in either direction produces an inverse movement of said jaws, substantially as described.

In testimony that I claim the above I hereunto set my hand.

EDWARD D. SCHMITT.

In presence of—
GEO. PARKS,
ORLANDO WILCOX.